United States Patent [19]
Atkins et al.

[11] Patent Number: 4,770,708
[45] Date of Patent: Sep. 13, 1988

[54] METHOD OF DISPOSING OF MINING TAILINGS

[75] Inventors: Anthony S. Atkins, Stafford; David Hughes, Stroke-on-Trent; Raghu N. Singh, Nottingham, all of England

[73] Assignee: Coal Industry (Patents) Limited, United Kingdom

[21] Appl. No.: 923,201

[22] Filed: Oct. 27, 1986

[30] Foreign Application Priority Data

Nov. 1, 1985 [GB] United Kingdom ............... 8526967

[51] Int. Cl.⁴ ..................... C04B 7/13; C04B 18/12; C04B 14/32
[52] U.S. Cl. ..................................... 106/98; 106/89; 106/90
[58] Field of Search .................... 106/DIG. 1, 98, 90, 106/89

[56] References Cited

U.S. PATENT DOCUMENTS 2,250,107  7/1922  Nelles .......................... 106/98
4,257,814  3/1984  Kellet et al. ................. 106/90

FOREIGN PATENT DOCUMENTS 1473517   5/1977  United Kingdom .
1576943  10/1980  United Kingdom .
1602845  11/1981  United Kingdom .

Primary Examiner—William R. Dixon, Jr.
Assistant Examiner—David M. Brunsman
Attorney, Agent, or Firm—Stevens, Davis, Miller & Mosher

[57] ABSTRACT

A settable composition, especially useful in underground mining may be produced by mixing mining tailings with a fine pozzolanic ash, and producing a pumpable slurry, and mixing the pumpable slurry with another composition containing a cement component. Good compressive strength may be obtained while at the same time troublesome or costly disposal of the tailings is avoided.

5 Claims, 1 Drawing Sheet

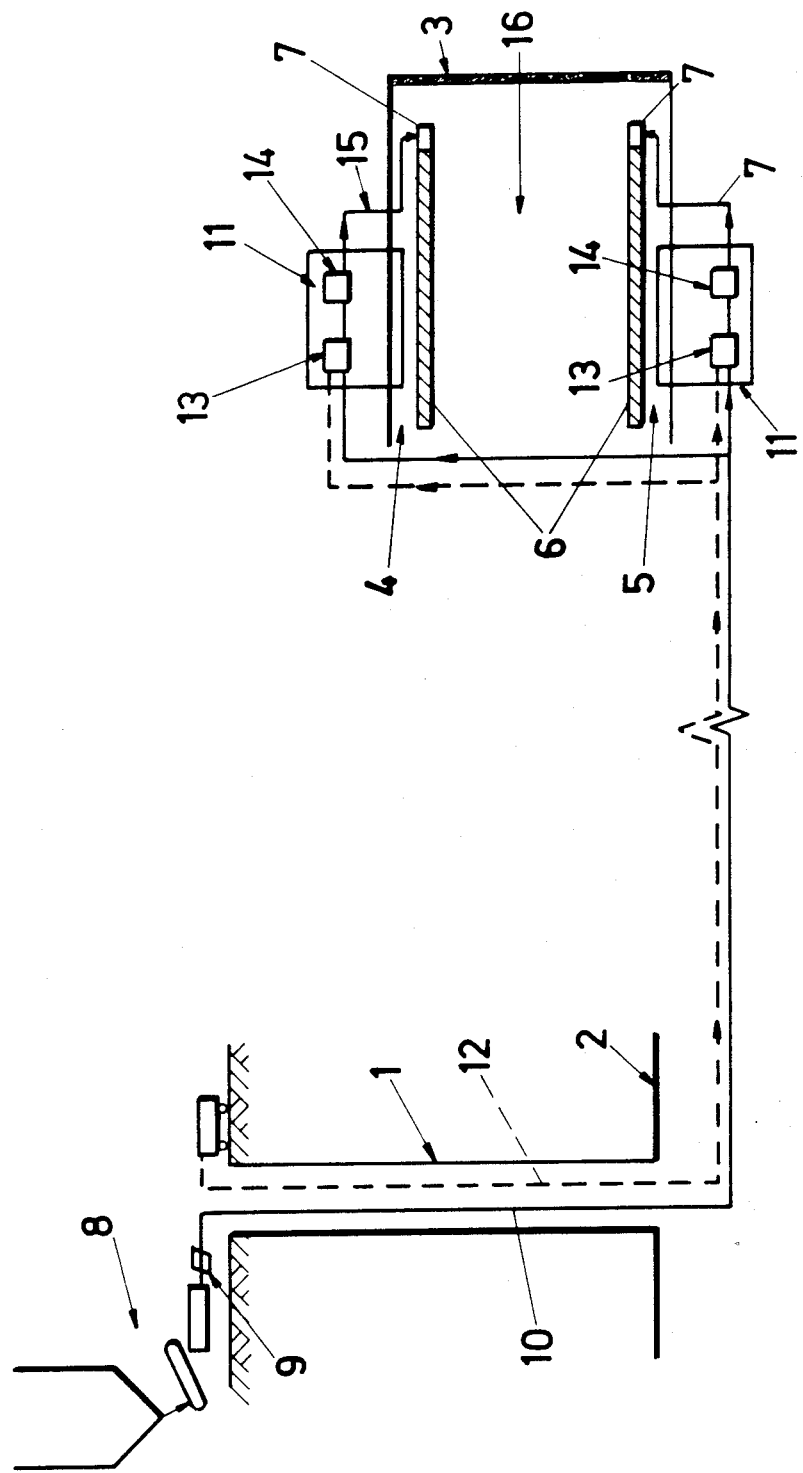

METHOD OF DISPOSING OF MINING TAILINGS

This invention concerns settable compositions and methods for their use. More especially, it concerns settable compositions comprising a cementitious component, tailings and an ash, especially suitable for the filling of cavities underground.

BACKGROUND OF THE INVENTION

It is known to fill cavities in underground mines using a settable mixture including cement, bentonite and water, for the purposes of supporting the roof, stabilizing underground roadways, sealing areas to prevent or control access of air, etc. A number of proprietary mixtures are marketed, the most modern of these have high water-to-solids contents and incorporate high alumina cement.

Tailings, in the context of coal mining, are the very fine residues from coal processing, and comprise particles of less than 0.5 mm size, of dirt and a proportion of coal, and water, the water content being variable to over from 45% to more than 70% by weight. Modern mining techniques, involving mechanization of coal mining and transport, produce even larger quantities of fines, but environmental and safety considerations currently mitigate against the most economical method of disposal of fines, by lagoon settling. It is known to dry tailings by various methods, and also to stabilizing, at least to some extent, tailings by the incorporation of cement, and to use the stabilizing material as a low quality material in civil engineering or the stabilizing material is simply tipped.

SUMMARY OF THE INVENTION

We have now found that tailings can be used in settable compositions, together with cementitious materials to fill underground cavities, for example in mines. It should be understood that other waste materials, such as coarse colliery discard (generally +0.5 mm) which is normally surface tipped, may be crushed to −10 mm or less and admixed with the tailings. The invention therefore provides a method of forming a set supportive and/or sealing material comprising forming a first composition by mixing tailings having a water content of 45 to 85% by weight with a fine pozzolanic ash, monitoring the moisture content of the first composition and adding water when necessary to produce a pumpable slurry, pumping said pumpable slurry to a point of use, admixing with said slurry at the point of use a second composition comprising a cement component to form a settable cementitious composition, and allowing the settable composition to set and harden in a desired location into a supportive and/or sealing material.

The first and/or the second composition may desirably comprise a suspending agent, of which bentonite (available widely as sodium bentonite) is favoured because of its availability and price. The tailings do usually contain clay or like minerals which have a suspending action in slurries, but the composition of minerals in tailings varies from colliery to colliery, indeed from seam to seam, and it is preferred that routine testing is carried out for each source of tailings to establish an optimum quantity of bentonite, this would expect to be in the range 0.1 to 5% by weight of the total mass of the settable composition.

The ash which is added desirably comprises pulverized fuel ash, which is preferably in the form of the very fine fly ash which is recovered from the flue gases of coal fired boilers. Fly ash is a waste product which poses it own disposal problems. Other ash material which has pozzolanic properties or at least does not have any disadvantageous effect on the slurry or the settable composition may be present, and there may also be mentioned ash from waste incinerators and/or ash from District Heating systems. The ash should have a particle size which permits easy pumpability and suitable properties of the settable composition; fly ash has a particle size such that about 80% by weight are below 75 microns in size. In general, with pozzolanic materials, setting times in conjunction with cement components can be improved by increasing the proportion of fine to coarse material, by grinding. Any grinding step, however, adds costs to the method and materials. The ash component is effective not only by virtue of its pozzolanic properties but also to control the water content of the tailings. As has been indicated the moisture content of tailings, even when thickened using a conventional thickener, may vary quite substantially over a period. It is undesirably complicated to alter the feeding rate of the other components according to the solids content of the tailings, and hence it is desirable to increase the solids content by the adding of ash at a given feed rate and, according to the invention, to monitor the moisture content in order that a suitable pumpable slurry of substantially constant solids content is achieved.

The pumpable slurry may be mixed with the cement components in any appropriate manner. For example, a separate cementitious slurry of the cement components may be prepared adjacent the point of use, and the two slurries mixed in known manner, eg using a Y-tube mixer or splash mixing. Another method involves the pneumatic conveying of the dry cement components, to the point of use where the pumpable slurry and the dry cement components may be mixed immediately before filling the packhole, for example using a GUNITE ® spray gun. The mixed settable composition may be prepared in the desired location or may be prepared adjacent the desired location, and pumped thereto. It is envisaged that the major use of the method will be in the formation of pumped roadside packs, in underground mines but it may also be used in any situation requiring back filling or for constructing seals in underground workings. A desired location may be defined by a pump pack bag or other container, or by disposable or removable shuttering, perhaps utilising a face of a previous set mass of set material, and/or a floor section and-/or a roof section of a mine excavation as part of the surfaces defining the location.

The cement component is not critical to the present invention, provided that the settable mass has adequate properties for the duty to be performed, principally in the development of compressive strength and Young's modulus. The cement may thus be, for example, a high alumina cement, a blend of high alumina cement and ordinary portland cement, ordinary portland cement, rapid hardening portland cement, or a special cement. In each case, additives to the commercially available cement may be found desirable, including lime, forms of calcium sulphate, set retarders and hardening accelerators. A preferred cement component is ordinary portland cement with an accelerator comprising sodium carbonate, potassium carbonate and triethanolamine, which has been found to give good performance at a price much lower than cements based upon high alumina cement. It may be desirable in some circumstances that the pumpable slurry contains an accelerator for the cement or contains a component which together with the cement component in or forming the second composition forms a suitable cement, but which does not cause setting or settling of the pumpable slurry.

It will be appreciated that the present invention provides a method of pump packing which not only has low material costs based on unit volume of pack, but also reduces costs to a colliery of disposal of tailings. The invention may therefore be applied in general in underground mines for strata control, subsidence control and sealing against spontaneous combustion (heatings and fires). In the case of subsidence control, where the material requires a relatively low setting load, the material would be injected into the waste and allowed to solidify.

BRIEF DESCRIPTION OF THE DRAWING

The present invention will now be described with reference to the accompanying single FIGURE of schematic drawing (not to scale) which is a composite view of a mine showing the left portion in vertical section and the right portion in plan view.

DETAILED DESCRIPTION

The shaft and a main roadway (shown in section) of an underground mine are represented by 1 and 2 respectively. An advancing longwall coal face (shown in plan), 3, is remote from the shaft bottom, and has a maingate, 4, and tailgate, 5. For simplicity the coal cutting machine and advancing roof supports which are found on the face, are not shown. Roadside packs 6, are arranged at the sides of the maingate and tailgate, and unfilled pump packing bags, 7, are shown.

A tailings and PFA mixing point is indicated at 8, and a moisture content monitor, 9, acts to monitor moisture and to control the addition of water if variation in the water content of the tailings causes the mixture to depart from a pre-determined specification. The mixture is pumped through line, 10, to two pumping stations, 11, which are advanced with the face. A dry cement/bentonite mixture is pneumatically transported through line, 12, to the pumping stations. Each pumping station has a mixer unit, 13, and a pump unit, 14 and the resulting mixture is pumped a short distance through a flexible hose, 15, into the pump packing bags, 7.

As an alternative, the mixer unit and pump unit (13,14) may be replaced on the movable pumping stations, by a compressor arrangement feeding dry cement/bentonite mixture under pressure to a GUNITE ® spray gun which is also fed with the pumpable tailings/PFA mix.

The waste area between the roadways, 16, which in conventional advancing longwall mining is allowed to cave, may be packed according to the present invention with a settable composition similar or identical to that used for forming roadside packs. For subsidence control in the waste area, the lower setting load may be economically catered for by reducing the proportion of cement in the settable composition.

The invention may also be applied to retreat mining for the same purposes. Additionally, the invention may be used to support roadways in retreat mining, a technique which is used with current pump packing materials at Abernant Colliery, South Wales.

Settable mixtures according to the invention were prepared in the laboratory and samples were tested to establish mean uniaxial compressive strength at 24 hours and 48 hours curing time. The components, by weight, of the mixtures A to F listed below are set forth with comprehensive strength results, in the Table.

The tailings were samples from Hucknall Colliery, England and in each case had a 70% moisture content, and it can be seen that the proportion of cement is required to be 17.5% or above to achieve a mean compressive strength greater than 0.4 MN/m2 at 48 hours and to demonstrate satisfactory strength development. Other tests carried out with tailings of 58% moisture content gave satisfactory results at 10% cement content, or above.

Cost/performance comparisons with the two principal pump packing methods used in the United Kingdom indicate that, even without taking into account the costs of tailings disposal, the invention provides the most cost effective packing system.

| Mixture | Tailings Solid | Tailings Water | PFA | Portand Cement | Sodium Bentonite | Accelerator Sodium Carbonate | Accelerator Potassim Carbonate | TEA* | Mean Uniaxial Compressive Strength (MN/m$^2$) 24 hrs | Mean Uniaxial Compressive Strength (MN/m$^2$) 48 hrs |
|---|---|---|---|---|---|---|---|---|---|---|
| A | 18.88 | 40.0 | 26.98 | 7.5 | 2 | 0.375 | 0.07 | 0.11 | 0.05 | 0.16 |
| B | 18.30 | 42.75 | 26.17 | 10 | 2 | 0.5 | 0.1 | 0.15 | 0.038 | 0.07 |
| C | 17.76 | 41.43 | 25.36 | 12.5 | 2 | 0.62 | 0.12 | 0.18 | 0.07 | 0.13 |
| D | 17.2 | 40.12 | 24.56 | 15 | 2 | 0.75 | 0.15 | 0.22 | 0.15 | 0.15 |
| E | 16.63 | 38.80 | 23.75 | 17.5 | 2 | 0.87 | 0.17 | 0.26 | 0.29 | 0.87 |
| F | 16.06 | 37.48 | 22.95 | 20 | 2 | 1.0 | 0.2 | 0.3 | 0.46 | 1.95 |

*TEA = Triethanolamine

We claim:

1. A method of forming a set supportive and/or sealing material comprising forming a first composition by mixing tailings comprising particles of less than 0.5 mm diameter having a water content of 45 to 85% by weight with a fine pozzolanic ash, monitoring the moisture content of the first composition and adding water when necessary to form a pumpable slurry of desired solids content, pumping said pumpable slurry to a point of use, admixing with said slurry at the point of use a second composition comprising a cement component to form a settable cementitious composition, and allowing the settable composition to set and harden in a desired location into a supportive and/or sealing material.

2. A method as claimed in claim 1, wherein the first and/or the second composition comprises a suspending agent.

3. A method as claimed in claim 1, wherein the fine pozzolanic ash comprises pulverised fuel ash.

4. A method as claimed in claim 3, wherein the pulverised fuel ash is a fly ash having approximately 80% by weight of particles below 75 microns in size.

5. A method as claimed in claim 1, wherein the cement component comprises ordinary portland cement and an accelerator which comprises sodium carbonate, potassium carbonate and triethanolamine as incorporated in the pumpable slurry.

* * * * *